United States Patent

Fichot et al.

[11] Patent Number: 5,263,802
[45] Date of Patent: Nov. 23, 1993

[54] PIN FOR THE ALIGNMENT OF TWO ELEMENTS AND DEVICE FOR CENTERING A COVER ON A VESSEL MAKING USE OF THIS TYPE OF PIN

[75] Inventors: Philippe Fichot, St Desert; Jean-Pierre Roinjard, Fontaines, both of France

[73] Assignee: Framatome, Courbevoie, France

[21] Appl. No.: 842,967

[22] Filed: Feb. 28, 1992

[30] Foreign Application Priority Data

Feb. 28, 1991 [FR] France .............. 91 02417

[51] Int. Cl.⁵ .................................. F16B 13/04
[52] U.S. Cl. ........................ 411/26; 411/21; 403/370
[58] Field of Search ............ 411/32, 25, 27, 28, 411/24, 26, 59, 58, 355, 437, 924.1, 44, 57, 15, 180, 295, 63, 64, 65, 21, 263; 403/297, 314, 337, 370, 369, 368, 335

[56] References Cited

U.S. PATENT DOCUMENTS

| | | | |
|---|---|---|---|
| 1,021,794 | 4/1912 | Pleister | 411/21 |
| 2,719,747 | 10/1955 | Layne | 411/55 X |
| 3,014,399 | 12/1961 | Schaffner | 411/21 |
| 3,561,798 | 2/1971 | Redfern | 403/370 |
| 4,089,613 | 5/1978 | Babbitt, Jr. | 403/370 X |
| 4,270,434 | 6/1981 | Bucheli | 411/21 |
| 4,501,520 | 2/1985 | Bergner | 411/21 |
| 4,673,320 | 6/1987 | Froehlich | 411/21 |

FOREIGN PATENT DOCUMENTS

| | | | |
|---|---|---|---|
| 1500807 | 5/1970 | Fed. Rep. of Germany . | |
| 2046519 | 3/1972 | Fed. Rep. of Germany | 411/24 |
| 2139437 | 10/1972 | Fed. Rep. of Germany . | |
| 3816523 | 11/1989 | Fed. Rep. of Germany . | |
| 2245870 | 4/1975 | France | 403/297 |
| 903593 | 2/1982 | U.S.S.R. | 411/21 |

Primary Examiner—Rodney M. Lindsey
Attorney, Agent, or Firm—Pollock, Vande Sande & Priddy

[57] ABSTRACT

A pin (101) for alignment of two elements (1, 3) each comprising at least one orifice (2, 4) to be positioned coaxially with each other, the first element (1) being stationary and the second element (3) being radially displaceable. The alignment pin comprises a cage (11) having a diameter smaller than the diameter of the orifices (2, 4) of the two elements (1, 3) and intended to be placed in these orifices (2, 4). The cage (11) comprises radial expansion blocks (13) for centering the pin (10) in the orifice (2) of the first stationary element (1) forming a reference and for displacement of the second element (3) in relation to the first element (1). The pin is used for centering a cover on a nuclear reactor vessel.

12 Claims, 6 Drawing Sheets

PIN FOR THE ALIGNMENT OF TWO ELEMENTS AND DEVICE FOR CENTERING A COVER ON A VESSEL MAKING USE OF THIS TYPE OF PIN

FIELD OF THE INVENTION

The present invention relates to a pin for the alignment of two elements each comprising at least one orifice intended to be positioned coaxially with one another.

The present invention also relates to a device for centering a cover on a vessel, especially of a nuclear reactor, making use of this type of pin.

BACKGROUND OF THE INVENTION

Many industrial uses currently involve employing positioning members, for example for centering one element relative to another, and connecting members for fastening these elements to one another.

This applies particularly to containments used in industry, especially the nuclear industry, such as, for example, the vessels of nuclear reactors or of steam generators, or in the chemical or petrochemical industry, where a cover is fastened removably to vessel, to make it possible to carry out periodic maintenance work in the vessel.

For this purpose, the cover is fastened to the vessel by means of bolts which are screwed into internally threaded holes provided in the upper part of the vessel and which penetrate into open-ended bores provided in the flange of the cover and corresponding to the internally threaded holes.

These bolts are generally used in somewhat large numbers and relatively close to one another, and therefore the dismounting and refitting of the cover require the unscrewing and screwing of all these bolts.

These operations, particularly the screwing of the bolts, is a haphazard and difficult operation which necessitates special precautions for carrying it out.

In fact, in view of the large size and dimensions of the elements, it often happens that the coaxiality of the orifices of the two elements to be assembled together is not maintained at the moment of screwing of the bolts.

These alignment errors can cause jamming during the screwing of the bolts, thereby giving rise to stresses unevenly distributed over the moving parts and thereby to irregular and premature wear.

SUMMARY OF THE INVENTION

The object of the present invention is to overcome these disadvantages and to provide a pin which makes it possible to locate the optimum coaxial position of the orifices intended for assembling the two elements together, such as, for example, the orifices of a cover and a vessel of a nuclear reactor.

The subject of the present invention is a pin for the alignment of two elements, each comprising at least one orifice to be positioned coaxially with one another, the first element being stationary and the second element being radially displaceable. The pin comprises a cage of a diameter smaller than the diameter of the orifices of the two is elements and intended to be placed in these orifices, and the cage comprises radial expansion means for centering the pin in the orifice of the first stationary element forming a reference and for the displacement of the second element in relation to the first element.

According to other characteristics of the invention:

the cage has a generally cylindrical shape, the means of radial expansion are formed by at least two blocks distributed symmetrically about the axis of the cage and each seated in a corresponding longitudinal aperture in the cage, and are radially displaceable simultaneously by means of a control member arranged in the cage, each aperture comprises a U-shaped central part and, at each of its ends, a countersink with a flat bottom, each block comprises, on its outer face and from the top downwards, two projecting fences distant from one another and intended for interacting with the orifice of the second displaceable element, and an appendage provided with a f ace intended for bearing on the first stationary element and perpendicular to the axis of the pin, each block comprises, on its outer face and at its lower end, a projecting fence intended for interacting with the orifice of the first stationary element, the fences have a curved outer profile inscribed within a circle, each block comprises, on its inner face and at each end, a ramp inclined to the same degree in opposite directions, the control member comprises (a) an axial operating screw free in terms of rotation only, comprising a central part for rotational guidance and translational retention in the cage and two threaded ends, with pitches of the same value, but opposite, and two nuts, each mounted on the corresponding threaded end of the screw and intended for displacing the blocks radially during the translational movement of the nuts as a result of the rotation of the operating screw, the threads of the nuts have pitches of the same value, but opposite, each nut comprises, on its periphery, at least two plane surfaces inclined by the same amount and each intended for interacting with the inclined ramp of the corresponding block, the blocks are retained by at least one return spring keeping the blocks in contact with the nuts, the cage comprises, at its lower end, an expanding ring intended for interacting with the orifice of the first stationary element and radially displaceable by means of a mechanism independent of the control member, the displacement mechanism of the expanding ring is
  formed by a conical ramp formed in the lower part
  of a sleeve surrounding the cage of the pin and
  longitudinally displaceable parallel to the axis of
  the pin, and the sleeve comprises apertures for the passage of the fences of the blocks, which fences oppose the rotation of the sleeve.

Another subject of the present invention is a device for centering a cover on a vessel, especially of a nuclear reactor, each comprising orifices intended to be positioned coaxially with one another, and comprising at least two alignment pins, as described above.

BRIEF DESCRIPTION OF THE DRAWINGS

The invention will be better understood from the following description given solely by way of example and with reference to the accompanying drawings, in which.

DETAILED DESCRIPTION

The invention will be described hereinafter for the positioning of a cover on a vessel, for example a nuclear reactor, by means of a centering device making use of the alignment pins according to the invention.

Such alignment pins can, of course, be employed in other industrial uses and, in general terms, for the centering of two elements, each comprising at least one orifice intended to be positioned coaxially with one another. The upper part of vessel 1 comprises a set of internally threaded holes 2 distributed symetrically over a circumference which is concentric with the main axis of the vessel and each intended for receiving the threaded of a connecting member (not shown).

Figure 1:
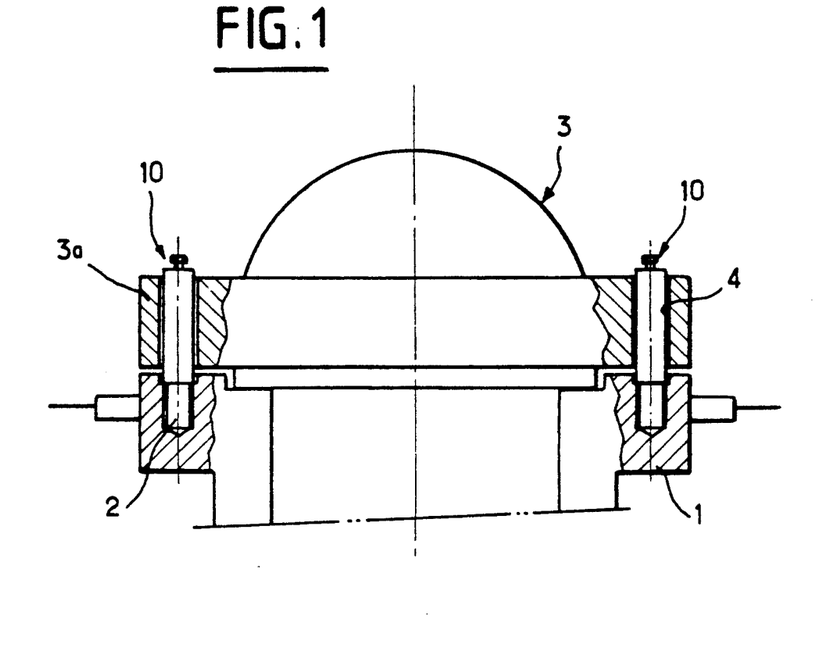
FIG. 1 is a schematic elevation view of the cover of a vessel of a nuclear reactor comprising the alignment pins according to the invention.
Figure 2:
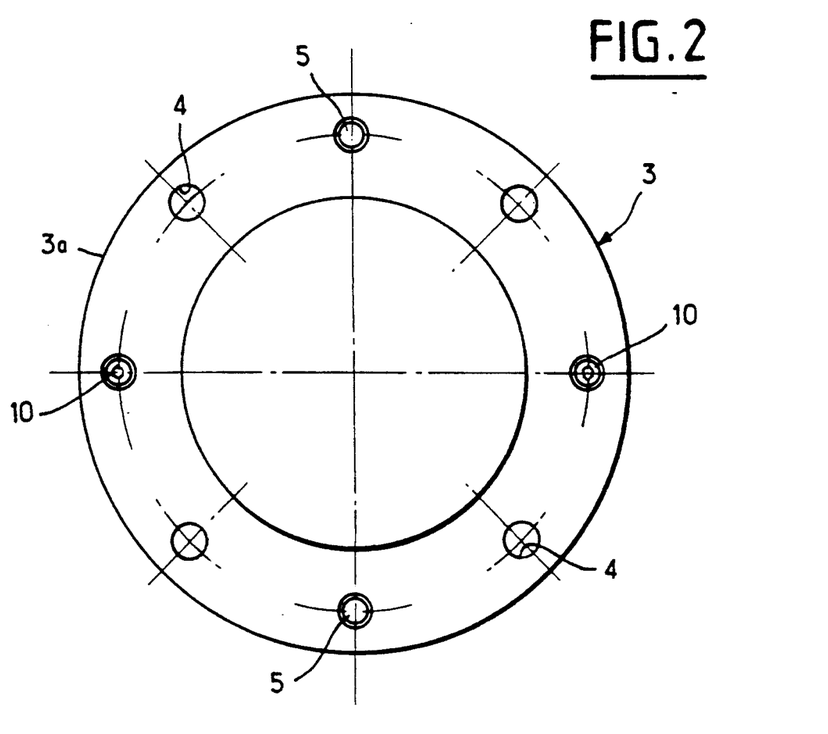
FIG. 2 is a top plan view of FIG. 1.

Cover 3 is provided with a peripheral flange a pierced with open-ended bores 4 corresponding to the internally threaded holes 2 of the vessel 1 and distributed symmetrically over a circumference which is concentric relative to the main axis of said cover (FIG. 2). Each open-ended bore 4 allows the passage of a connecting member.

During the closing of the vessel 1, the cover 3 is placed onto the vessel by means of a polar bridge and by means of a handling appliance, neither of which is shown.

The prepositioning of the cover 3 vertically in line with the vessel I is made easier by the installation of two non-expanding guide rods 5 (FIG. 2) taking the place of two diametrically opposed connecting members and passing through the two corresponding bores 4 of the cover 3.

These guide rods 5 have a diameter smaller than the diameter of the bores 4 and therefore provide play relative to the bores.

The functional plays existing between the cover 3 and the vessel 1 ensure that there remains a misalignment of the cover 3 relative to the vessel 1 considered to be too great, particularly during the operation of screwing the connecting members into the internally threaded holes 2 of the vessel 1.

To make it possible to remedy this situation, there is used in addition to the guide rods a device according to the invention which makes it possible to locate the optimum position of the cover 3 in relation to the vessel 1.

Thus, two alignment pins 10 according to the invention, arranged at 90° relative to the guide rods 5, are added instead of two connecting members.

Figure 3:
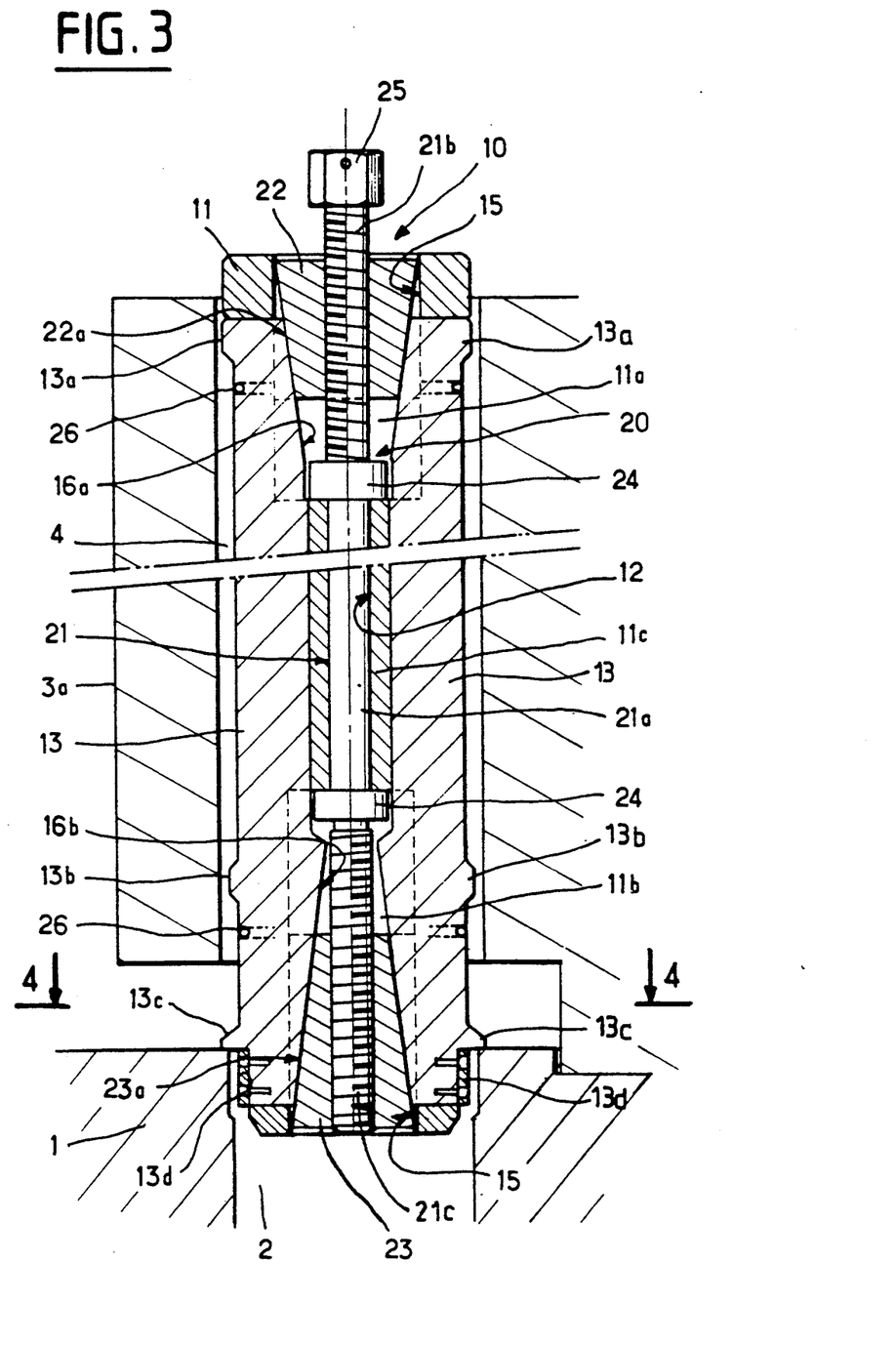
FIG. 3 is a view in longitudinal section of a first embodiment of an alignment pin according to the invention, the expansion means of the pin being in the retracted position.
Figure 4:
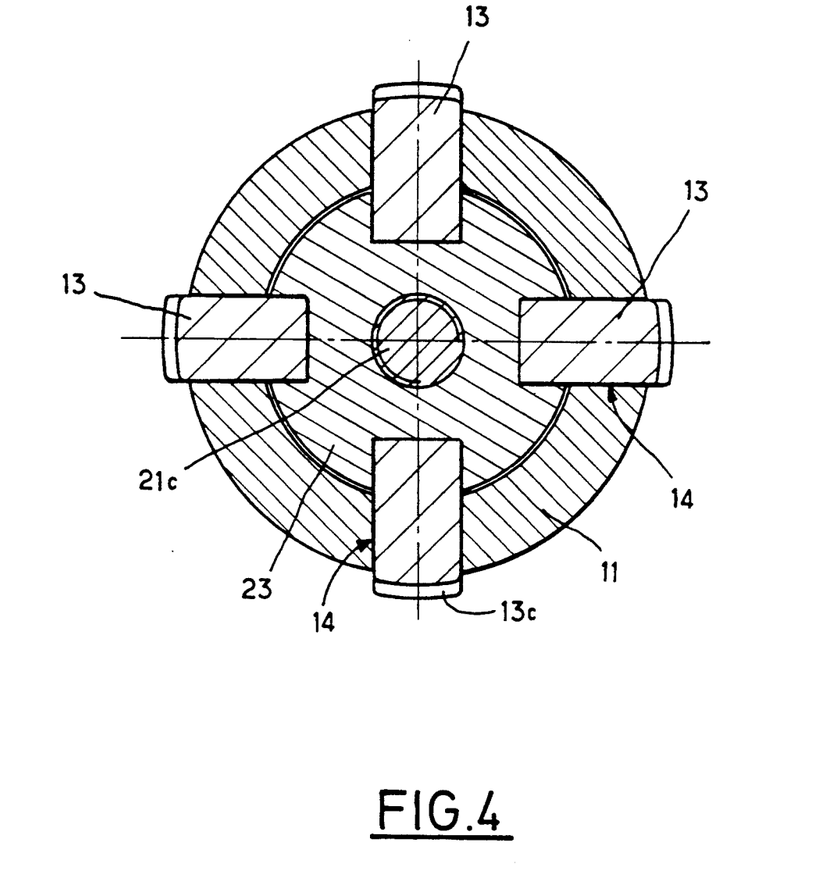
FIG. 4 is a sectional view along line 4—4 of FIG. 3.

Referring now to FIGS. 3 and 4, an alignment pin 10 will be described in more detail.

The alignment pin 10 comprises a cage 11 of generally cylindrical shape and of a diameter smaller than that of the bores 4 of the cover 3 and of the internal threaded holes 2 of the vessel 1.

Cage 11 comprises, at each of its ends and over some of its height, a cylindrical countersink 11a and 11b respectively, and a solid central part 11c pierced by a bore 12 on the axis of pin 10.

The pin 10 is equipped with radial expansion means for centering it in the internally thread bore 2 of the stationary vessel 1 forming a reference and for radial displacement of the cover 3 in relation to the vessel.

In the example illustrated, these expansion means are formed by four blocks 13 distributed symmetrically about the axis of the cage 11 and extending over some of its height.

Each block 13 is seated in a longitudinal aperture 14 comprising a U-shaped central part and, at each of its ends, a countersink 15 with a flat bottom.

Each block 13 comprises, on its outer face and from the top downwards, two projecting fences 13a and 13b respectively, distant from one another and intended for interacting with the bore 4 of the cover 3, an appendage 13c provided with a bearing face perpendicular to the axis of the pin and intended for coming into contact with the upper surface of the vessel 1 and, at its lower end, a projecting fence 13d intended for interacting with the internally threaded hole 2 of vessel 1.

The fences 13a, 13b and 13d may have a curved outer profile inscribed within a circle.

All the fences can be attached and secured to the block 13 by conventional means.

Furthermore, each block 13 comprises, on its inner face and at each end, a ramp 16a and 16b respectively, inclined to the same degree but in opposite directions.

The blocks 13 are radially displaceable simultaneously by means of a control member. 20 arranged in the cage 11.

This control member 20 comprises a rotatable but non-rotatable axial operating screw 21.

The operating screw 21 is composed of three parts performing separate functions, namely, a central part 21a passing through the bore 12 of the solid part 11c of the cage 11 and held on each side by a stop 24 which ensures the rotational guidance and translational retention of the screw and two parts 21b and 21c respectively, located at the ends and each having a thread of the same but opposite direction.

The threads of the nuts 22 and 2 likewise have the same pitches but opposite directions.

The nut 22 is screwed onto the threaded end 21b, and the nut 23 is screwed onto the threaded end 21c.

The nut 22 comprises, on its periphery, four inclined surfaces 22a each intended for interacting with the inclined ramp 16a of each block 13.

Likewise, the nut 23 comprises, on its periphery, four inclined surfaces 23a each intended for interacting with the inclined ramp 16b of each block 13.

The number of inclined surfaces 22a and 23a formed on the periphery of each nut 22 and 23 corresponds to the number of blocks 13. The upper end of screw 21 is provided with an operating member 25 for driving the screw in rotation.

The block 13 are retained by two return springs 26 keeping each block 13 in contact with the nuts 22 and 23.

Cage 11 may be tubular and comprise an attached axial stop for the operating screw 21.

The final positioning of the cover 3 on the vessel 1 is carried out as follows.

After the cover 3 has been prepositioned on the vessel 1 by means of the two guide rods 5, an alignment pin 10 is installed in two bores 4 of the cover 3 which are arranged at 90° relative to rods 5.

The blocks 13 of each pin are in the retracted position shown in FIG. 3.

Each pin 10 is introduced into the corresponding bore 5, in such a way that the fence 13d of the blocks 13 penetrates into the upper countersink of the internally threaded hole 2 and the bearing face of the appendage 13c rests on the upper surface of the vessel 1.

Subsequently, for each pin 10, the screw 21 is rotated by means of the operating member 25, thereby driving the nuts 22 and 23 in translational movement towards one another as a result of the opposite pitches of the ends 21b and 21c of the screw and of the threads of the nuts.

The translational movement of the nuts 22 and 23 brings about the radial expansion of blocks 13 by means of the inclined surfaces 22a and 23a of said nuts and the inclined planes 16a and 16b of the blocks 13.

Figure 5:
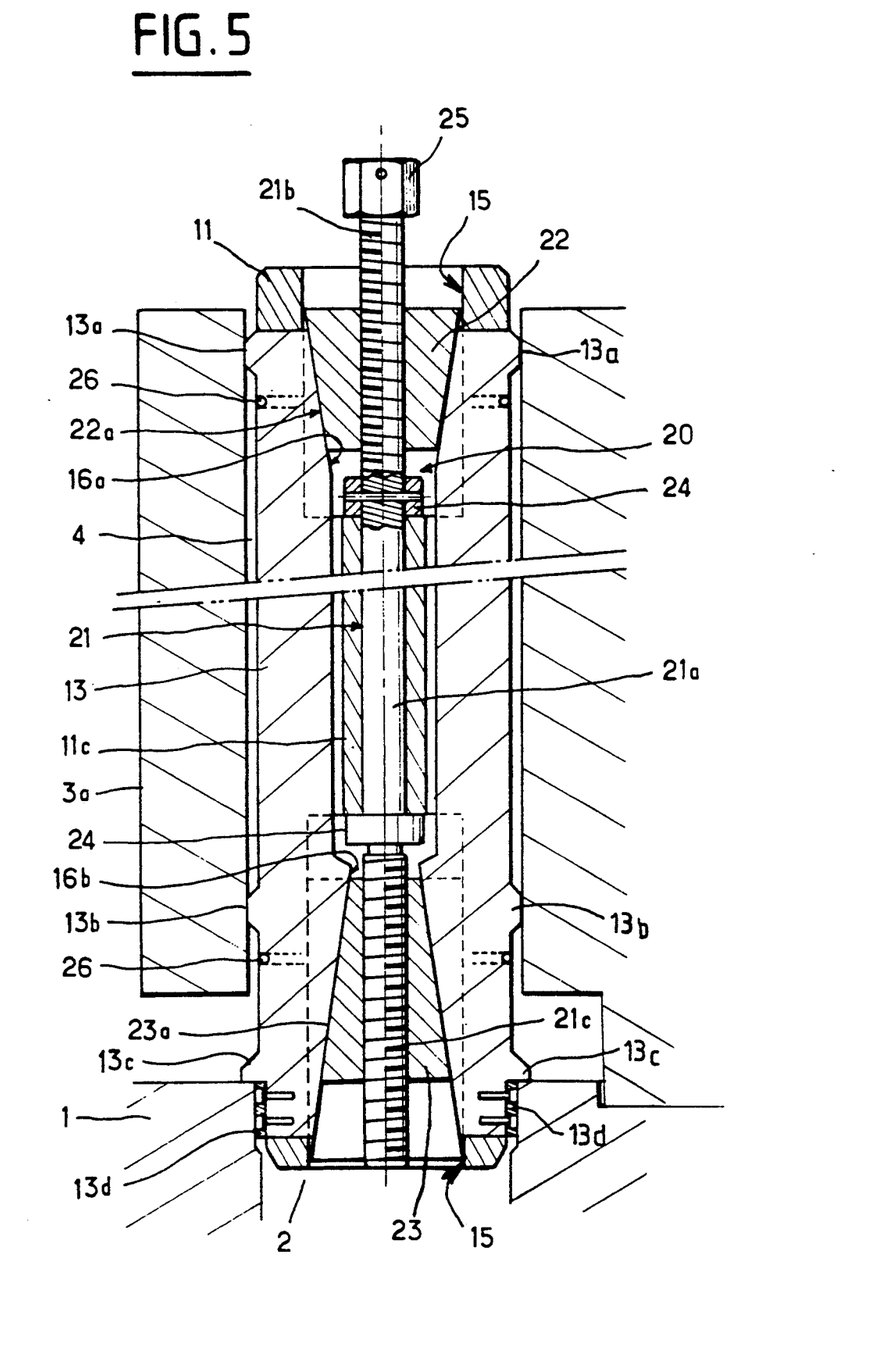
FIG. 5 is a view similar to that of FIG. 3, with the expansion means extended for centering the cover on the vessel.

The fence 13d of the blocks 13 of each pin 10 bears in the countersink of the internally threaded hole 2 of the vessel 1, and the fences 13a and 13b bear in the bore 4 of the cover 3 (FIG. 5).

The radial displacement of the blocks 13 makes it possible to center the corresponding pin in the internally threaded hole 2 of the stationary vessel I forming a reference and simultaneously to displace the cover 3 in relation to the vessel, in order to position bores 4 coaxially with internally threaded holes 2, thus facilitating subsequent screwing of the assembly members.

The displacement of the assembly consisting of the cover and its equipment amounting to approximately 160T is possible with very low forces by rotating the operating screws of the alignment pins manually by means of a torque of less than 10m.daN. The expansion of the alignment pins therefore makes it possible without difficulty to displace the cover in the desired directions both for centering and for orientation.

Figure 6:
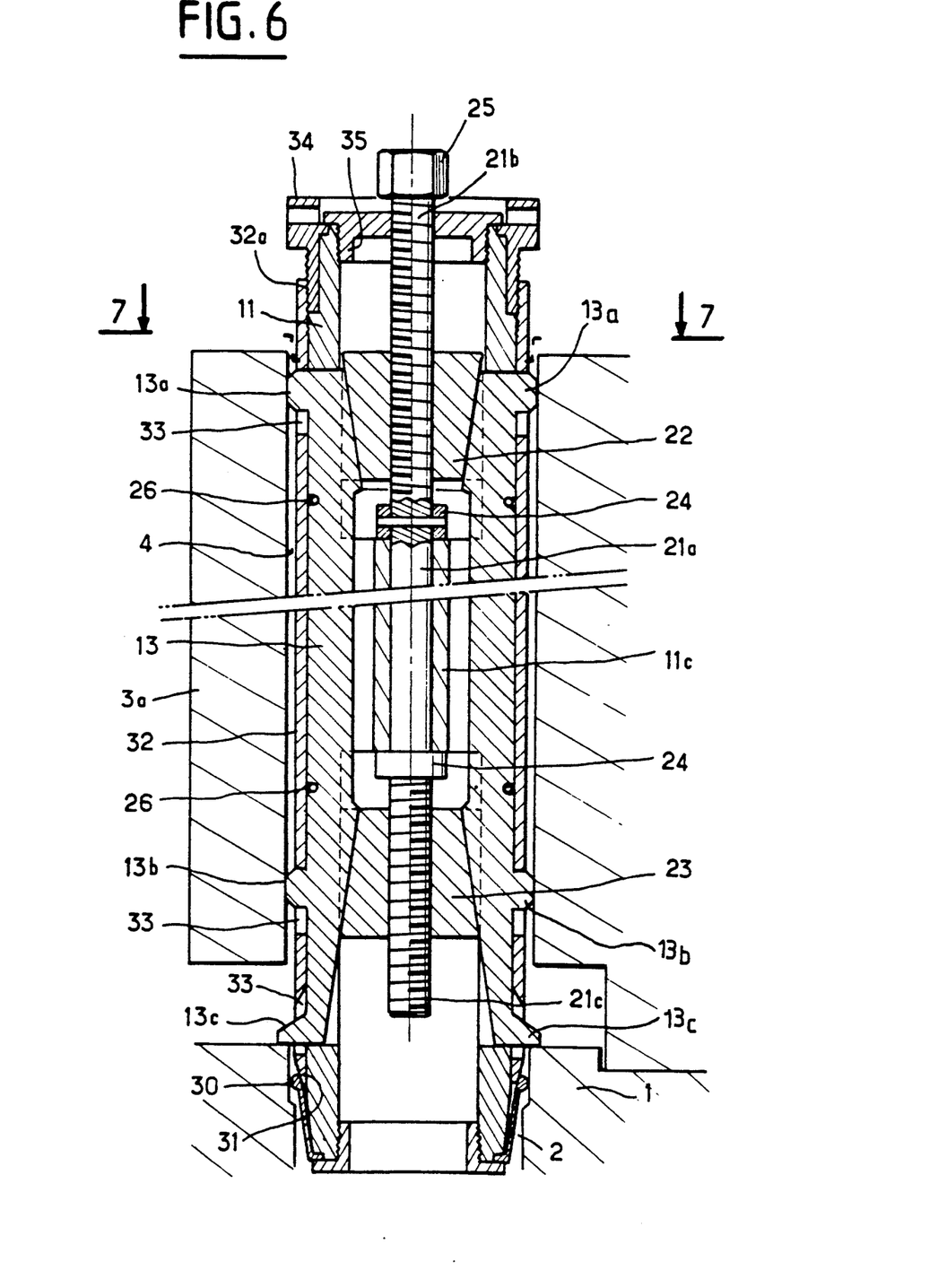
FIG. 6 is a view in longitudinal section of a second embodiment of an alignment pin according to the invention.
Figure 7:
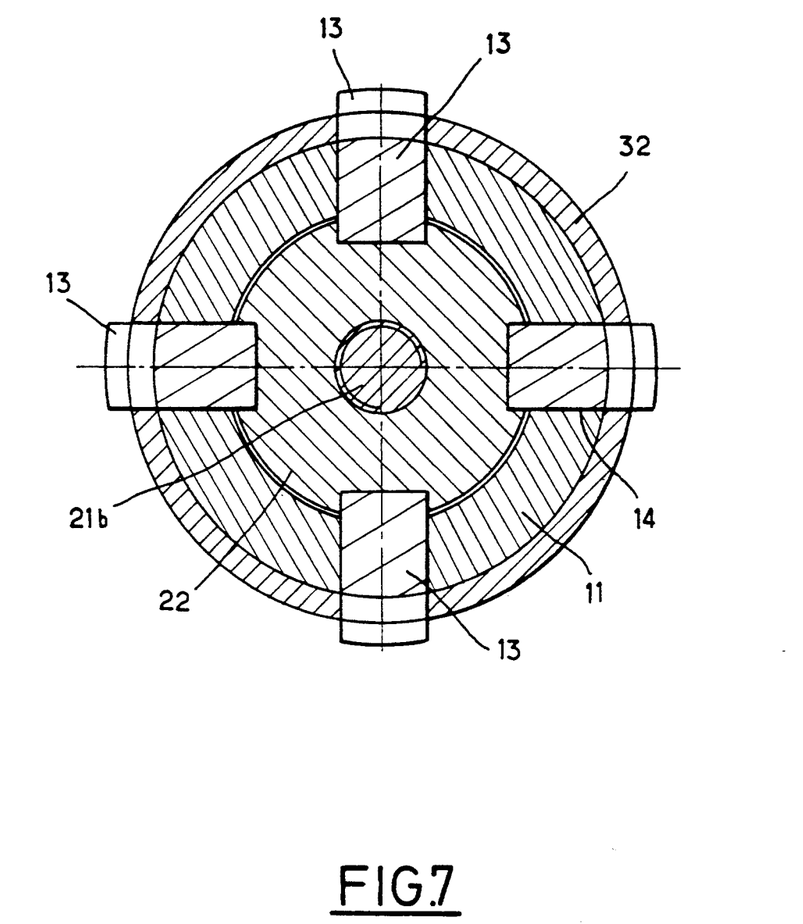
FIG. 7 is a sectional view along the line 7—7 of FIG. 6.

FIGS. 6 and 7 show a second embodiment of an alignment pin according to the invention, the elements identical to the preceding embodiment being designated by the same reference.

In this case, each block 13 comprises, on its outer face and from the top downwards, two projecting fences 13a and 13b respectively, distant from one another and intended for interacting with the bore 4 of the cover 3, and an appendage 13c provided with a face intended for bearing on the vessel 1 and perpendicular to the axis of the alignment pin.

The cage 11 is provided, in its lower part and on its periphery, with fences or with a radially displaceable expanding ring 30 intended for interacting with the countersink of the internally threaded hole 2 of the vessel 1.

This expanding ring 30 is radially displaceable by means of a mechanism independent of the control member 20.

This mechanism is formed by a conical ramp 31 formed at the lower end of a sleeve 32 surrounding the cage 11, this sleeve being longitudinally displaceable parallel to the axis of the pin.

The sleeve 32 comprises, level with the fences 13a and 13b and with the appendage 13c, apertures 33 for allowing the passage of these fences and this appendage.

Apertures 33 are sufficiently large to allow the displacement of the sleeve 32, and the fences 13a and 13b as well as the appendage 13c oppose the rotation of the sleeve.

The upper end of sleeve 32 is provided with an internal thread 32a, into which is screwed a threaded ring 34 bearing on the cage 11.

The threaded ring 34 is held by a stop ring 35 screwed into the cage 11.

Each pin 10 is introduced into the corresponding bore 5, in such a way that the expanding ring 30 penetrates into the upper countersink of the internally threaded hole 2 and that the bearing face of the appendage 13c rests on the upper surface of the vessel 1.

Subsequently, for each pin 10, the threaded ring 34 is rotated, thereby causing the longitudinal displacement of the sleeve 32 and, by means of the conical ramp 31, the expansion of the ring 30.

This expanding ring 30 bears in the countersink of the internally threaded hole 2, thus ensuring the centering of the corresponding pin.

To center the cover 3 and the vessel 1, the same action is taken as in the preceding embodiment by rotating the operating screw 21 of each pin 10 in order to obtain the expansion of the blocks 13 which displace the cover 3.

We claim:

1. Pin (10) for alignment of first and second elements (1, 3) to be positioned coaxially one relative to the other, each of said elements comprising at least one orifice (2, 4), said first element (1) being stationary and said second element (3) being radially displaceable, wherein said pin comprises a generally cylindrical cage (11) having a diameter smaller than a diameter of said orifices (2, 4) and being adapted to be positioned in said orifices (2, 4), said cage (11) comprising radial expansion means (13) for centering said pin (10) in said orifice (2) of said first stationary element (1) forming a reference location and for displacement of said second element (3) in relation to said first element (1), wherein said radial expansion means comprise at least two blocks (13) distributed symmetrically about an axis of said cage (11) and each being seated in a corresponding longitudinal aperture (14) in said cage (11), said blocks (13) being radially displaceable simultaneously by means of a control member (20) arranged in said cage (11), and wherein each block (13) comprises a ramp (16a, 16b) on an inner face and at each end of said block, said ramps being inclined to the same degree but in opposite directions.

2. Alignment pin according to claim 1, wherein each aperture (14) comprises a U-shaped central part and, at each of its ends, a countersink with a flat bottom.

3. Alignment pin according to claim 1, wherein each block (13) comprises, on an outer face of said block and from the top downwards, two projecting fences (13a, 13b) remote from one another and intended for interacting with said orifice (4) of said second displaceable element (3), and an appendage (13c) provided with a face intended for bearing on said first stationary element (1) and perpendicular to an axis of said pin (10).

4. Alignment pin according to claim 1, wherein each block (13) comprises, on an outer face and at a lower end of said block, a projecting fence (13d) for interacting with said orifice (2) of said first stationary element (1).

5. Alignment pin according to claim 3 or 4, wherein said fences (13a, 13b, 13d) have a curved outer profile inscribed within a circle.

6. Alignment pin according to claim 1, wherein said control member (20) comprises a rotatable but non-translatable axial operating screw (21) comprising a central part (21a) for rotational guidance and translational retention in said cage (11), and two threaded ends (21b, 21c) having pitches of the same value but opposite directions and two nuts (22, 23) each mounted on a corresponding threaded end of said screw (21) and intended for displacing said blocks (13) radially during translational movement of said nuts (22, 23) resulting from rotation of said operating screw (21).

7. Alignment pin according to claim 6, wherein threads of said nuts (22, 23) have pitches of the same value, but opposite directions.

8. Alignment pin according to claim 6, wherein each nut (22, 23) comprises, on its periphery, at least two plane surfaces (22a, 23a) inclined by a same amount and each intended for interacting with an inclined ramp (16a, 16b) of a corresponding block (13).

9. Alignment pin according to claim 6, wherein said blocks (13) are retained by at least one return spring (26) keeping said blocks (13) in contact with said nuts (22, 23).

10. Alignment pin according to claim 1, wherein a lower end of said cage (11) comprises an expanding ring (30) intended for interacting with an orifice (2) of said first stationary element (1) and radially displaceable by means of a mechanism (31) independent of said control member (20).

11. Alignment pin according to claim 10, wherein said mechanism is formed by a conical ramp (31) formed in a lower part of a sleeve (32) surrounding said cage and longitudinally displaceable parallel to an axis of said pin.

12. Alignment pin according to claim 11, wherein said sleeve (32) comprises apertures (33) for passage of fences of said blocks (13) opposing rotation of said sleeve (32).

* * * * *